(12) United States Patent
Maino et al.

(10) Patent No.: US 7,333,612 B2
(45) Date of Patent: **\*Feb. 19, 2008**

(54) METHODS AND APPARATUS FOR CONFIDENTIALITY PROTECTION FOR FIBRE CHANNEL COMMON TRANSPORT

(75) Inventors: Fabio R. Maino, Palo Alto, CA (US); Claudio DeSanti, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 609 days.

This patent is subject to a terminal disclaimer.

(21) Appl. No.: 10/805,111

(22) Filed: Mar. 19, 2004

(65) Prior Publication Data

US 2005/0207579 A1  Sep. 22, 2005

(51) Int. Cl.
*H04K 1/00* (2006.01)
*H04L 9/00* (2006.01)
(52) U.S. Cl. ...................... 380/256; 380/279
(58) Field of Classification Search ............. 380/256
See application file for complete search history.

(56) References Cited

U.S. PATENT DOCUMENTS 6,061,794 A * 5/2000 Angelo et al. ............... 726/3

OTHER PUBLICATIONS

NCITS, "Fibre Channel Generic Services—3, Rev. 7.01," Nov. 2000.*
Maino, et al., "Methods and Apparatus for Security Over Fibre Channel", U.S. Appl. No. 10/034,367, filed Dec. 27, 2001, 39 pages.
T. Wu, "The SRP Authentication and Key Exchange System", RFC 2945 Sep. 2000, pp. 1-7.
Bruce Schneier, *Applied Cryptography—Protocols, Algorithms, and Source Code in C*, Chapter 3, "Basic Protocols", pp. 47-74.
International Search Report and Written Opinion for corresponding PCT Patent Application No. PCT/US05/09096 dated Mar. 29, 2007.
FIBRE Channel Generic Services—3, (FC-GS-3) Rev. 7.01, Working Draft, Standard, Nov. 28, 2000.

* cited by examiner

*Primary Examiner*—Matthew Heneghan
(74) *Attorney, Agent, or Firm*—Beyer Weaver LLP

(57) ABSTRACT

Methods and apparatus are provided for improving message-based security in a Fibre Channel network. More specifically, the present invention relates to methods and apparatus for providing confidentiality for Fibre Channel control messages encapsulated within Common Transport Information Units. Control messages transported with the Fibre Channel Common Transport protocol, and passed between Fibre Channel network entities, can be encrypted providing confidentiality combined with data origin authentication, integrity and anti-replay protection provided by existing Fibre Channel security mechanisms.

15 Claims, 6 Drawing Sheets

Figure 2

| SAID 201 | Destination 203 | GS_Type 209 | GS_Subtype 211 | Key Information 205 | Algorithm Information 207 |
|---|---|---|---|---|---|
| 2378349 | 01:02:03 | FC | 02 | 32jlkkl4321k534 | 3DES, MD5 |
| ⋮ | ⋮ | | | ⋮ | ⋮ |
| ⋮ | ⋮ | | | ⋮ | ⋮ |
| ⋮ | ⋮ | | | ⋮ | ⋮ |

METHODS AND APPARATUS FOR CONFIDENTIALITY PROTECTION FOR FIBRE CHANNEL COMMON TRANSPORT

CROSS-REFERENCE TO RELATED APPLICATION

This application is related to U.S. patent application Ser. No. 10/034,367, entitled "Methods and Apparatus for Security over Fibre Channel," which is hereby incorporated by reference in its entirety for all purposes.

BACKGROUND OF THE INVENTION

1. Field of the Invention

The present invention relates to Fibre Channel security. More specifically, the present invention relates to methods and apparatus for providing confidentiality for Fibre Channel control messages encapsulated within Common Transport Information Units.

2. Description of Related Art

Very limited security exists in Fibre Channel networks. One form of security for Fibre Channel networks is physical security. All Fibre Channel network entities, such as switches, disks, tape libraries, disk arrays, and servers can be located in a secure and trusted environment. Access can be limited and strict controls can be maintained over the Fibre Channel fabric. However, it is not always feasible to locate every Fibre Channel network entity in a secured environment.

Some security schemes have focused more on secure links. When a new Fibre Channel network entity is introduced into a Fibre Channel fabric, directly neighboring nodes check the newly introduced entity to determine whether or not the newly introduced node is authorized to connect to the fabric. However, the checks are made only once by some directly neighboring nodes. Other more distant nodes are unable to perform any checking. Furthermore, once the link is established, no further security is provided. The fabric is deemed trusted even though the Fibre Channel fabric is still vulnerable to certain attacks such as spoofing, hijacking, or impersonation.

It is therefore desirable to provide methods and apparatus for improving security in a Fibre Channel network and in particular for improving authentication, confidentiality, message integrity protection, and anti-replay protection in a Fibre Channel fabric with respect to some or all of the limitations noted above.

The Fibre Channel Generic Services 3 ("FC-GS-3") Standard (formerly ANSI NCITS 348-2001) defines CT_Authentication, a security transform for Fibre Channel Common Transport Information Units, that may be used to provide anti-replay and integrity protection to control traffic. However, no provision is currently made to provide confidentiality to control traffic, even though such confidentiality would be highly desirable. Without confidentiality, Common Transport may not be used to transport sensitive data such as passwords or secrets that are a very valuable subset of control information.

SUMMARY OF THE INVENTION

Methods and apparatus are provided for improving confidentiality of control traffic in a Fibre Channel network. Messages passed between Fibre Channel network entities can be encrypted using information provided during the authentication sequence. This methods and apparatus can be combined with already existing authentication services for Fibre Channel Common Transport providing a complete set of security services such as per-message authentication, confidentiality, integrity protection, and anti-replay protection.

According to various embodiments, a method for processing Common Transport Information Units in a Fibre Channel network having a first network entity and a second network entity is provided. A CT_IU is received at a first network entity from the second network entity in a Fibre Channel network. A security control indicator in the CT_IU from the second network entity is identified. A security association identifier associated with the Common Transport Information Unit and corresponding to an entry in a security database is determined. A portion of the CT_IU is decrypted by using algorithm information contained in the entry in the security database.

In still other embodiments, a method for transmitting encrypted Common Transport Information Unit in a Fibre Channel network having a first network entity and a second network entity is provided. A CT_IU having a source corresponding to the first network entity and a destination corresponding to the second network entity is identified. It is determined if the CT_IU corresponds to the selectors of an entry in a security database. A portion of the CT_IU is encrypted using key and algorithm information associated with the entry in the security database. The Common Transport Information Unit is transmitted to the second network entity.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

FIG. 2 is a diagrammatic representation of a security database.

DETAILED DESCRIPTION OF SPECIFIC EMBODIMENTS

The present invention relates to security in a Fibre Channel fabric. More specifically, the present invention relates to methods and apparatus for providing confidentiality for Fibre Channel control messages encapsulated within Common Transport Information Units.

Reference will now be made in detail to some specific embodiments of the invention including the best modes contemplated by the inventors for carrying out the invention.

Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Fibre Channel Common Transport used in a storage area network. However, it should be noted that the techniques of the present invention can be applied to a variety of different protocols and networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Methods and apparatus of the present invention provide for security in Fibre Channel networks. The techniques of the present invention cover message-based security. Mechanisms are provided for encryption of Common Transport Information Units passed between Fibre Channel network entities.

Maino, Di Benedetto and DeSanti have submitted U.S. patent application Ser. No. 10/034,367 for "Methods and Apparatus for Security over Fibre Channel" that improves authentication, confidentiality, message integrity protection, and anti-reply protection in a Fibre Channel fabric. The method improves security of Fibre Channel frames at the FC-2 layer, but sometimes is necessary to secure only a subset of the entire Fibre Channel traffic, such as the control traffic transported as Common Transport Information Units, also called CT_IUs.

However, securing control traffic encapsulated in CT_IUs at the frame level may require keeping some state information associated with the frames belonging to the same CT_IU, and this complicates implementations. Providing security directly to a Common Transport Information Unit according to methods of the present invention does not require keeping frame by frame state information and is therefore advantageous.

Figure 1:
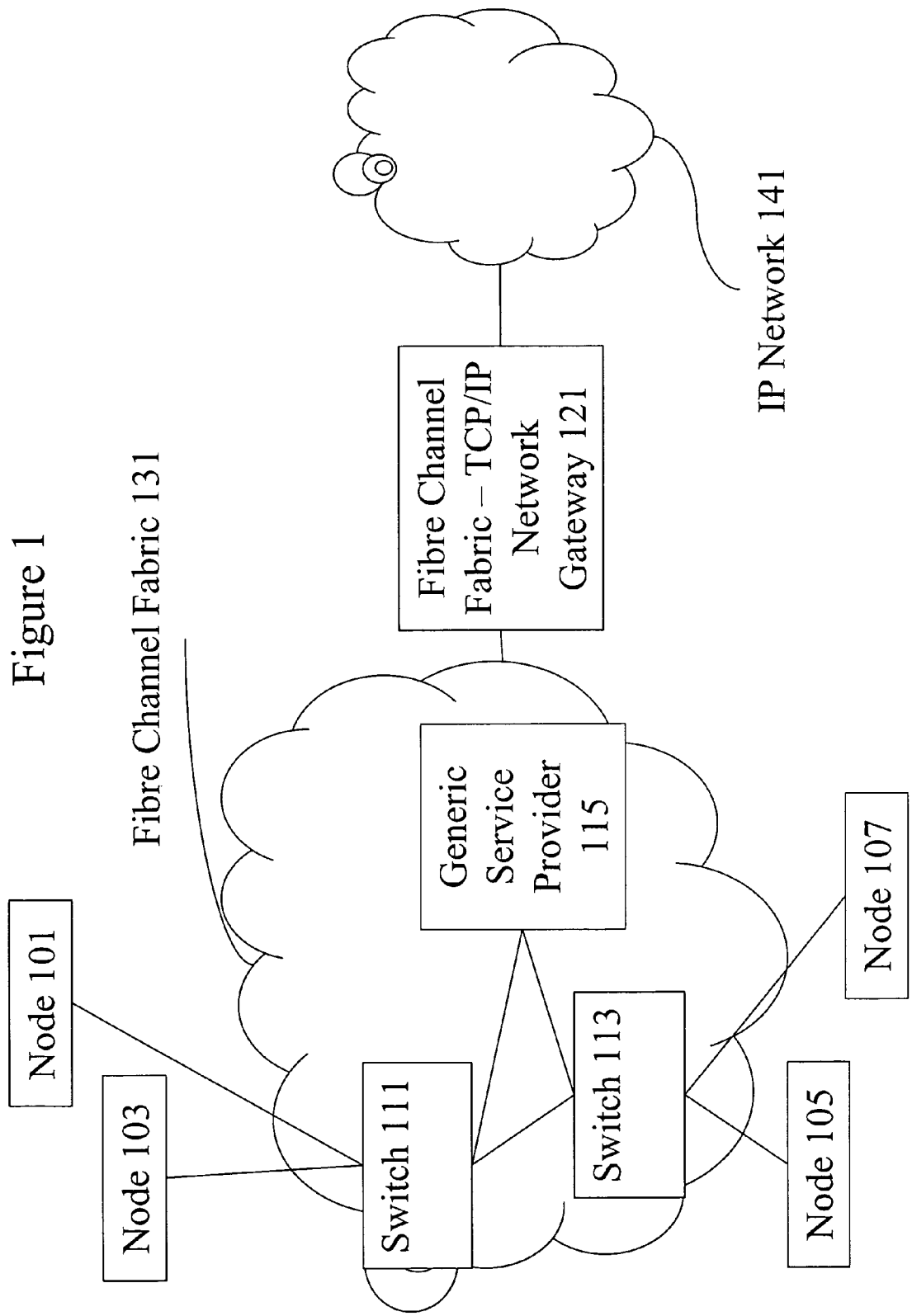
FIG. 1 is a diagrammatic representation of a network that can use the techniques of the present invention.

FIG. 1 is a diagrammatic representation of a network that can use the techniques of the present invention. A Fibre Channel fabric 131 can include a number of network entities such as switches 111 and 113 as well as a generic service provider 115, which may be yet another switch. The switches can be used to interconnect nodes 101, 103, 105, and 107. Nodes 101, 103, 105, and 107 can be entities such as servers, tape libraries, disk arrays, and/or just a bunch of disks (JBOD). The Fibre Channel architecture shown in FIG. 1 is a switch-based architecture. However, it should be noted that Fibre Channel networks can be implemented using a variety of different topologies such as arbitrated loop and point-to-point connections.

The Fibre Channel network 131 can be connected to a conventional IP network 141 through a device such as a Fibre Channel to IP gateway 121. Various authentication and encryption schemes exist in conventional TCP/IP networks. However, security in Fibre Channel networks has been limited primarily because physical security could be typically provided for Fibre Channel networks. In conventional Fibre Channel networks, all of the different network entities such as the arrays of disks, tape libraries, servers, switches, and generic service providers, etc., could be located in a controlled and trusted environment such as a secure office space or server room. However, techniques of the present invention recognize that physical security cannot always be provided.

Conventional Fibre Channel security mechanisms are limited in both capabilities and scope. One Fibre Channel authentication mechanism provides limited link based security. When a new network entity is introduced into the Fibre Channel network, immediate neighbors authenticate the new network entity and secure the link. After the link is secured, the network is considered trusted and no other security mechanisms are necessary. However, link based security does not prevent certain types of attacks. In one example, a network intruder can "spoof" the confidential information sent over the network, capturing sensitive information that might be further used to compromise the network. Without per-message confidentiality, an attacker between two FC entities can simply forward the Information Units exchanged by the two entities, and can observe all the traffic directed toward the attacked entity. When per-message confidentiality is in place, the messages captured by the attacker will be intelligible only to the receiver that has the appropriate cryptographic key to decrypt the protected Information Unit.

Existing Fibre Channel security mechanisms provide for integrity verification of Common Transport Information Units. No provision is currently made to provide confidentiality to CT_IUs. Consequently, methods and apparatus are provided for the implementation of efficient message-based encryption schemes for Common Transport Information Units.

Common Transport Information Units are used to access and provide Generic Services to Fibre Channel entities. As defined by FC-GS-3, some parameters carried inside the CT_IU itself specify the service to be accessed. In particular, the GS_Type parameter determines the Generic Service of interest, while the GS_Subtype parameter selects a specific sub-server under the specified Service. For example, a CT_IU carrying GS_Type equal to 'FCh' and GS_Subtype equal to '02h' is meant to access the Name Server sub-server (GS_Subtype='02h') under the Directory Services (GS_Type='FCh'). Instead a CT_IU carrying GS_Type equal to 'FAh' and GS_Subtype equal to '03h' is meant to access the Fabric Zone Server sub-server (GS_Subtype='03h') under the Management Services (GS_Type='FAh').

An existing authentication and key exchange sequence provides two Fibre Channel entities with a common key that may be leveraged to provide per-message security. Using that common key, each Fibre Channel message exchanged between two authenticated entities may be cryptographically transformed in a such a way that the receiver can verify several characteristics of the message such as the following: the message originated from the sender, the message has not been tampered with after transmission, and/or the message is not decipherable by one without the common key.

Each class of traffic exchanged between the two authenticated entities can be provided with different security services. Some security services for control and traffic messages include authentication, protection against tampering, and encryption. The relationship between two Fibre Channel ports that affords security services to traffic transmitted between the two ports is referred to herein as a security association. Examples of security association parameters are a security association identifier, the source address, the destination address, a sequence number, key information, and algorithm information. Outgoing traffic is transformed according to the parameters of the outgoing security association if the traffic matches the selectors of that security association. Examples of security association selectors are source identifiers, destination identifiers, and class of traffic. A security database can be used to determine whether Common Transport Information Units should be encrypted and authenticated based on parameters of the CT_IU itself, such as source and destination addresses and GS_Type and GS_Subtype parameters, identifying the traffic class. The security can be continuous and uninterrupted and can apply to any type of data encapsulated within CT_IUs exchanged between the two network entities.

FIG. 2 is a diagrammatic representation of a security database such as a security association database. In one embodiment, the first three columns of the database contain the security association selectors that determine which Common Transport Information Units will be secured according to the parameters specified in the security association. Selectors can be the destination address 203, and the class of traffic expressed as GS_Type 209 and GS_SubType 211. A security association database may contain an index such as a security association identifier SAID 201 that can be used to identify an entry in a security database. The security association identifier (SAID) column 201 gives information for determining whether the Common Transport Information Unit should be decrypted and the authentication verified during receipt of the CT_IU. The security database can also contain key information 205. Key information 205 can include session keys as well as information for encrypting, decrypting, or authenticating a message. A security database can also contain information relating to the algorithm used for encryption or authentication 207. Algorithms commonly used for encryption include 3DES/DES and AES while algorithms commonly used for authentication include MD5 and SHA1.

Figure 3:
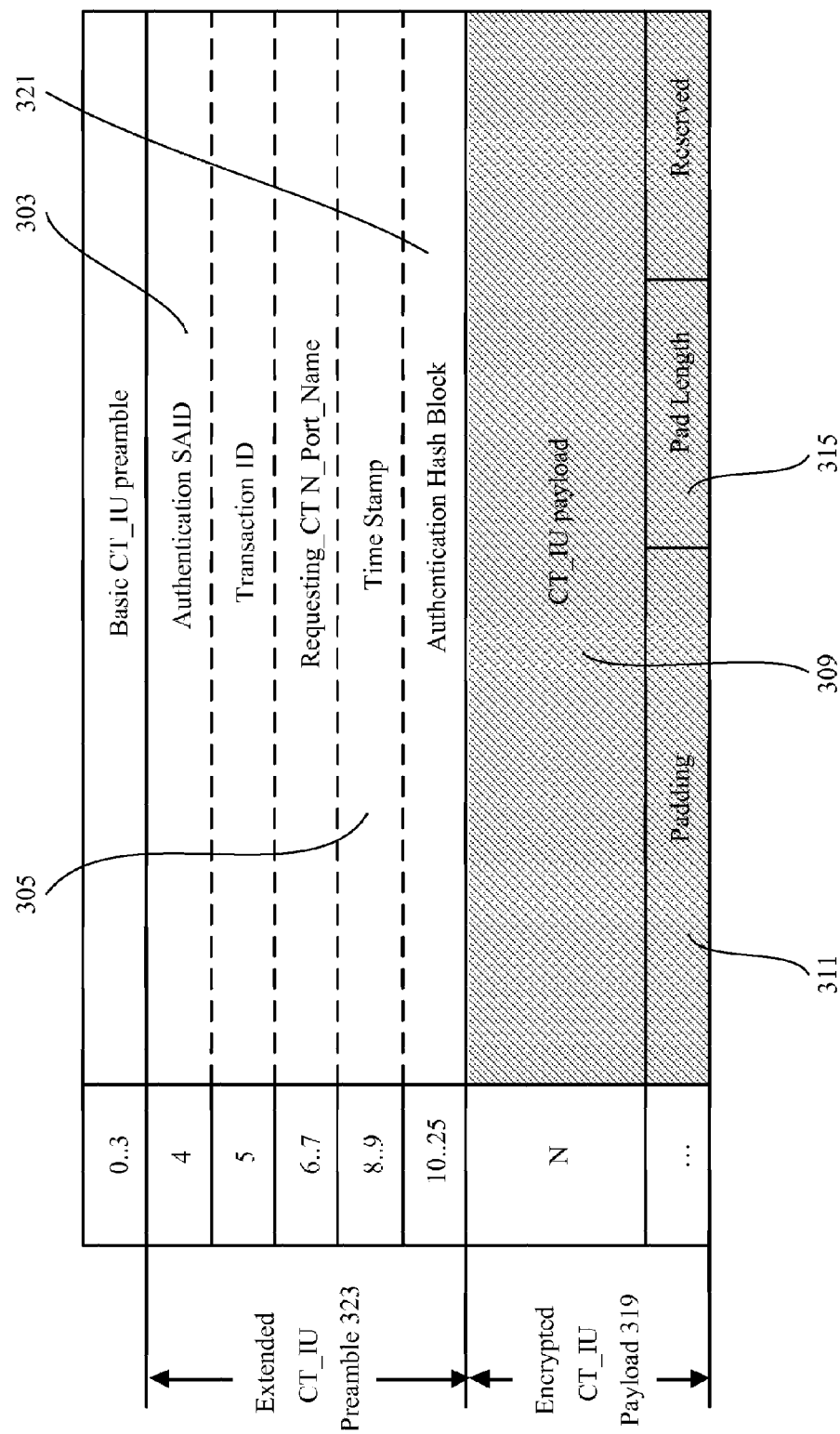
FIG. 3 is a diagrammatic representation of a secured Common Transport Information Unit transmitted over Fibre Channel.

FIG. 3 is a diagrammatic representation of a secured Common Transport Information Unit that can be transmitted between network entities in a Fibre Channel fabric. Each CT_IU contains a Basic CT_IU preamble as defined in FC-GS-3. A flag in the Basic CT_IU preamble indicates if the Extended CT_IU preamble is also part of the Information Unit. The Extended CT_IU preamble allows to secure a Common Transport Information Unit, by providing integrity services. According to various embodiments of the present invention, a Common Transport Information Unit may be secured with confidentiality services by encrypting a portion 319 of the CT_IU in conjunction with the Extended CT_IU preamble.

The Extended CT_IU preamble 323 may be also called security header. The security header 323 can include a security association ID 303 for identifying an entry in a security database. The security header 323 can also include a time stamp 305 for prevention of replay attacks. For secured Common Transport Information Units, CT_IU payload data 309, and payload padding 311 can be encrypted with the algorithms and key as indicated in the security database. As will be appreciated by one of skill in the art, padding provides for block alignment in encryption and authentication. Padding 311 can include a padding length 315 to indicate the amount to adjust after decryption.

The secured Common Transport Information Unit can also include authentication data 321, computed as specified by FC-GS-3 or by other methods. The portion encrypted can vary. In one example, only payload data is encrypted.

Figure 4:
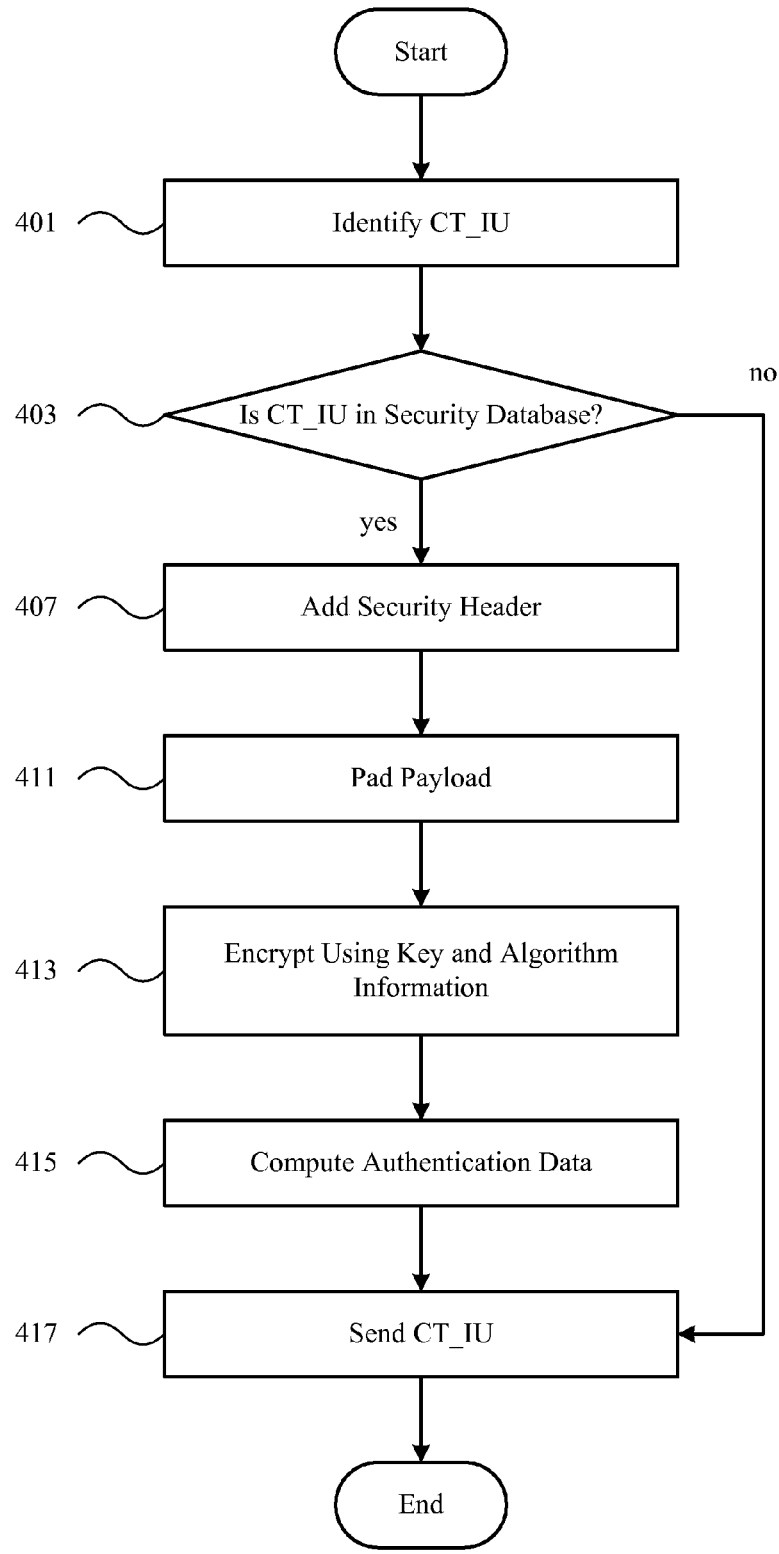
FIG. 4 is a process flow diagram showing the generation of a secured Common Transport Information Unit.

FIG. 4 is a process flow diagram showing the generation of a secured Common Transport Information Unit such as the one shown in FIG. 3. At 401, a CT_IU is identified. Identifying a CT_IU may entail locating an Information Unit queued for transmission. At 403, a security database is checked for a CT_IU that matches one of the selectors in the security association database. An entry may correspond to the identified CT_IU if the destination identifier of the Information Unit is contained in an entry in the security database. In another example, destination identifier, GS_Type and GS_Subtype can be compared with entries in a security database. If the CT_IU does not correspond with an entry in the security database, the Information Unit is transmitted at 417 without securing it. That is, a portion of the CT_IU is not encrypted and a portion of the Information Unit may not be hashed to allow for authentication. If the CT_IU does correspond to an entry in the database, the Extended CT_IU preamble shown in FIG. 3, with parameter values derived from the selected security association, is added to the Information Unit at 407, and the flag indicating its present is set in the Basic CT_IU preamble. The Extended CT_IU preamble can include the security association identifier, a time stamp, and authentication hash block data.

To allow for encryption and authentication at 411, the payload can be padded. At 413, a portion of the Common Transport Information Unit is encrypted using key information and algorithm information. The CT_IU may be encrypted using a session key agreed upon during an authentication and key exchange sequence between the node and the destination. The algorithm may also been agreed upon during the authentication and key exchange sequence. Algorithms typically used for encryption include DES/3DES and AES. At 415, authentication hash block data for inclusion in the Extended CT_IU preamble is calculated using key information, algorithm information, and a portion of the Information Unit resulting after modification in 413.

It should be noted that techniques of the present invention support both encryption and authentication for a subset of Fibre Channel Information Units, termed Common Transport Information Units. The standard FC-GS-3, however, does not provide encryption or privacy protection.

Figure 5:
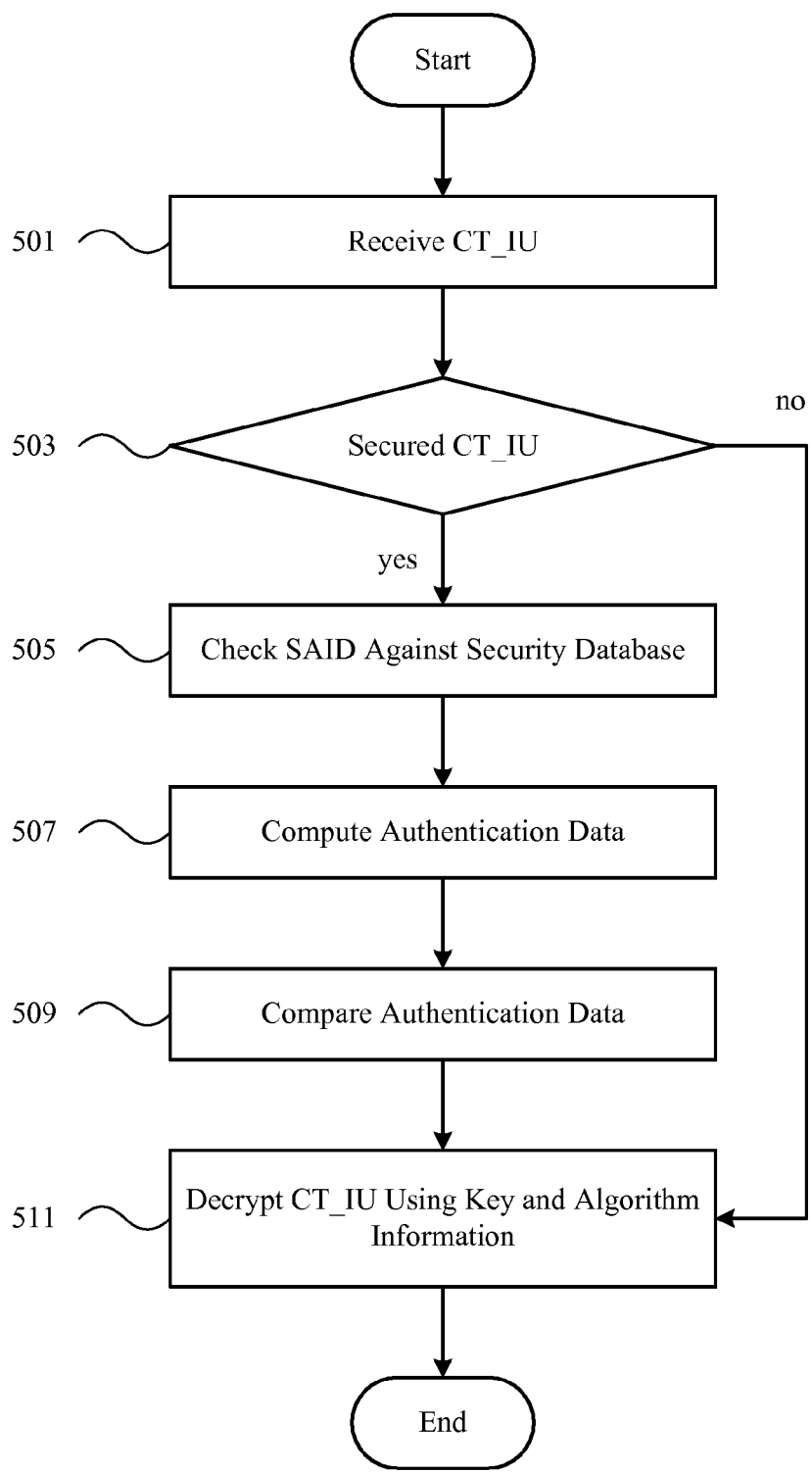
FIG. 5 is a process flow diagram showing the receipt and processing of a secured Common Transport Information Unit.

FIG. 5 is a process flow diagram showing a network entity in a Fibre Channel fabric receiving a Common Transport Information Unit. At 501, the CT_IU is received. At 503, it is determined if the information Unit is secured. Any indicator showing that the CT_IU is secured is referred to herein as a security control indicator. It should also be noted that, in certain embodiments, this is the same security control indicator used to determine if the Information Unit has an Extended CT_IU preamble. In other embodiments, a vendor specific indicator may be used. A CT_IU that supports encryption and authentication is herein referred to as a secured Common Transport Information Unit. A CT_IU that supports only authentication is herein referred to as an authentication secured Common Transport Information Unit. A CT_IU that supports only encryption is herein referred to as an encryption secured Common Transport Information Unit.

If the CT_IU is not secured, processing proceeds using conventional Fibre Channel rules. If the CT_IU is secured, an identifier such as a security association identifier is referenced against a security database such as a security association database at 505. Key information and algorithm information are extracted from the entry containing the identifier or security association identifier associated with the received Common Transport Information Unit. If the CT_IU is authentication secured, processing proceeds as a conventional CT_Authentication protocol: the authentication data is computed at 507 using key information, algorithm information, and encrypted data as noted in the security database. The authentication data computed is then compared at 509 with the authentication hash block data contained in the CT_IU. If the authentication hash block data matches, the identity of the sender is verified. Otherwise the Common Transport Information Unit is not authenticated and discarded. If the CT_IU is not authentication secured, the authentication processing described above is skipped.

After authentication, at 511, the encrypted portion of the Common Transport Information Unit can then be decrypted. Key information and encryption algorithm information are extracted from the entry containing the security association identifier associated with the received CT_IU, and the encrypted payload is decrypted. The padding included in the payload is removed, and the CT_IU is then processed using conventional Fibre Channel rules.

Figure 6:
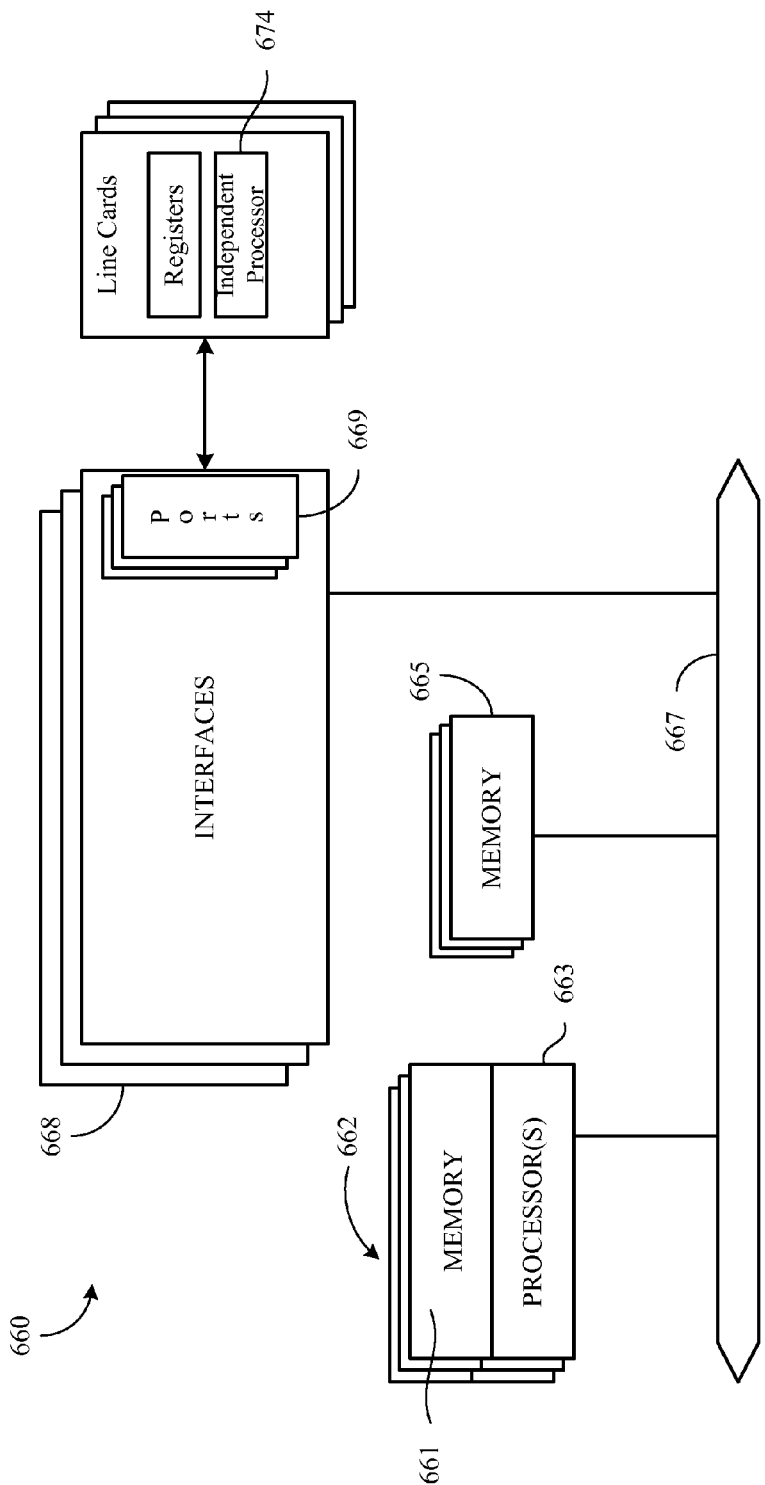
FIG. 6 is a network device that may be configured to implement some aspects of the present invention.

FIG. 6 illustrates an example of a network device that may be configured to implement some methods of the present invention. Network device 660 includes a master central processing unit (CPU) 662, interfaces 668, and a bus 667 (e.g., a PCI bus). Generally, interfaces 668 include ports 669 appropriate for communication with the appropriate media. In some embodiments, one or more of interfaces 668 includes at least one independent processor 674 and, in some instances, volatile RAM. Independent processors 674 may be, for example ASICs or any other appropriate processors. According to some such embodiments, these independent processors 674 perform at least some of the functions of the logic described herein. In some embodiments, one or more of interfaces 668 control such communications-intensive tasks as media control and management. By providing separate processors for the communications-intensive tasks, interfaces 668 allow the master microprocessor 662 efficiently to perform other functions such as routing computations, network diagnostics, security functions, etc.

The interfaces 668 are typically provided as interface cards (sometimes referred to as "linecards"). Generally, interfaces 668 control the sending and receiving of data packets over the network and sometimes support other peripherals used with the network device 660. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 662 may be responsible for implementing specific functions associated with the functions of a desired network device. According to some embodiments, CPU 662 accomplishes all these functions under the control of software including an operating system (e.g., Cisco SANOS, a proprietary operating system developed by Cisco Systems, Inc., etc.) and any appropriate applications software.

CPU 662 may include one or more processors 663 such as a processor from the Motorola family of microprocessors or the MIPS family of microprocessors. In an alternative embodiment, processor 663 is specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

Regardless of network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/linecards may be bus based (as shown in FIG. 6) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of architectures. In one example confidentiality protection could be extended to the requesting N_Port name field of the extended CT_IU preamble providing anonymity of the requestor. It is therefore intended that the invention be interpreted to include all variations and equivalents that fall within the true spirit and scope of the present invention.

What is claimed is:

1. A method for transmitting encrypted Common Transport Information Units in a Fibre Channel network having a first network entity and a second network entity, the method comprising:

identifying a Common Transport Information Unit having a source corresponding to the first network entity and a destination corresponding to the second network entity;

determining if the Common Transport Information Unit corresponds to selectors of a first entry in a security database, wherein the determining includes comparing a class of traffic of the Common Transport Information Unit against a class of traffic identified in the first entry;

when it is determined that the Common Transport Information Unit corresponds to the selectors of the first entry:

assigning a security association identification to the Common Transport Information Unit;

creating a second entry in the security database, the second entry including the security association identification and key and algorithm information;

encrypting a first portion of the Common Transport Information Unit using the key and algorithm information associated with the entry in the security database; and transmitting the Common Transport Information Unit to the second network entity.

2. The method of claim 1, wherein the entry in the security database was created after a Fibre Channel authentication protocol was executed between the first and second network entities.

3. The method of claim 1, wherein the Common Transport Information Unit carries an Extended CT_IU preamble and is confidentiality protected by encryption of the CT_IU payload.

4. The method of claim 3, wherein parameters in the Extended CT_IU preamble or in a Basic CT_IU preamble are protected for confidentiality.

5. The method of claim 4, wherein a CT_IU payload is padded prior to encrypting the first portion of the Common Transport Information Unit.

6. The method of claim 1, wherein a first portion of the Common Transport Information Unit is encrypted using an encryption algorithm selected from the group consisting of DES, 3DES and AES.

7. The method of claim 1, wherein the determining includes comparing the source of the Common Transport Information Unit against a source identified in the first entry.

8. The method of claim 1, wherein the determining includes comparing the destination of the Common Transport Information Unit against a destination identified in the first entry.

9. An apparatus for transmitting encrypted Common Transport Information Units in a Fibre Channel network having a first network entity and a second network entity, the apparatus comprising:

means for identifying a Common Transport Information Unit having a source corresponding to the first network entity and a destination corresponding to the second network entity;

means for determining if the Common Transport Information Unit corresponds to selectors of a first entry in a security database, wherein the means for determining includes means for comparing a class of traffic of the Common Transport Information Unit against a class of traffic identified in the first entry;

means for, when it is determined that the Common Transport Information Unit corresponds to the selectors of the first entry:

assigning a security association identification to the Common Transport Information Unit;

creating a second entry in the security database, the second entry including the security association identification and key and algorithm information;

encrypting a first portion of the Common Transport Information Unit using the key and algorithm information associated with the entry in the security database; and transmitting the Common Transport Information Unit to the second network entity.

10. The apparatus of claim 9, wherein the entry in the security database was created after a Fibre Channel authentication protocol was executed between the first and second network entities.

11. The apparatus of claim 9, wherein the means for determining includes means for comparing the source of the Common Transport Information Unit against a source identified in the first entry.

12. The apparatus of claim 9, wherein the means for determining includes means for comparing the destination of the Common Transport Information Unit against a destination identified in the first entry.

13. A network device for sending encrypted Common Transport Information Units in a Fibre Channel network, the network device comprising:

a plurality of ports for communication with other network devices in the Fibre Channel network; and at least one processor configured to perform the following steps:

identify a Common Transport Information Unit having a source corresponding to the first network entity and a destination corresponding to the second network entity;

determine if the Common Transport Information Unit corresponds to selectors of a first entry in a security database, wherein the determining includes comparing a class of traffic of the Common Transport Information Unit against a class of traffic identified in the first entry;

when it is determined that the Common Transport Information Unit corresponds to the selectors of the first entry:

assign a security association identification to the Common Transport Information Unit;

create a second entry in the security database, the second entry including the security association identification and key and algorithm information;

encrypt a first portion of the Common Transport Information Unit using the key and algorithm information associated with the entry in the security database; and transmit the Common Transport Information Unit to the second network entity.

14. The network device of claim 13, wherein the determining includes comparing the source of the Common Transport Information Unit against a source identified in the first entry.

15. The network device of claim 13, wherein the determining includes comparing the destination of the Common Transport Information Unit against a destination identified in the first entry.

* * * * *